June 19, 1951 K. M. NEWCUM 2,557,557
REFRIGERANT DRIER-FILTER UNIT
Filed March 23, 1948
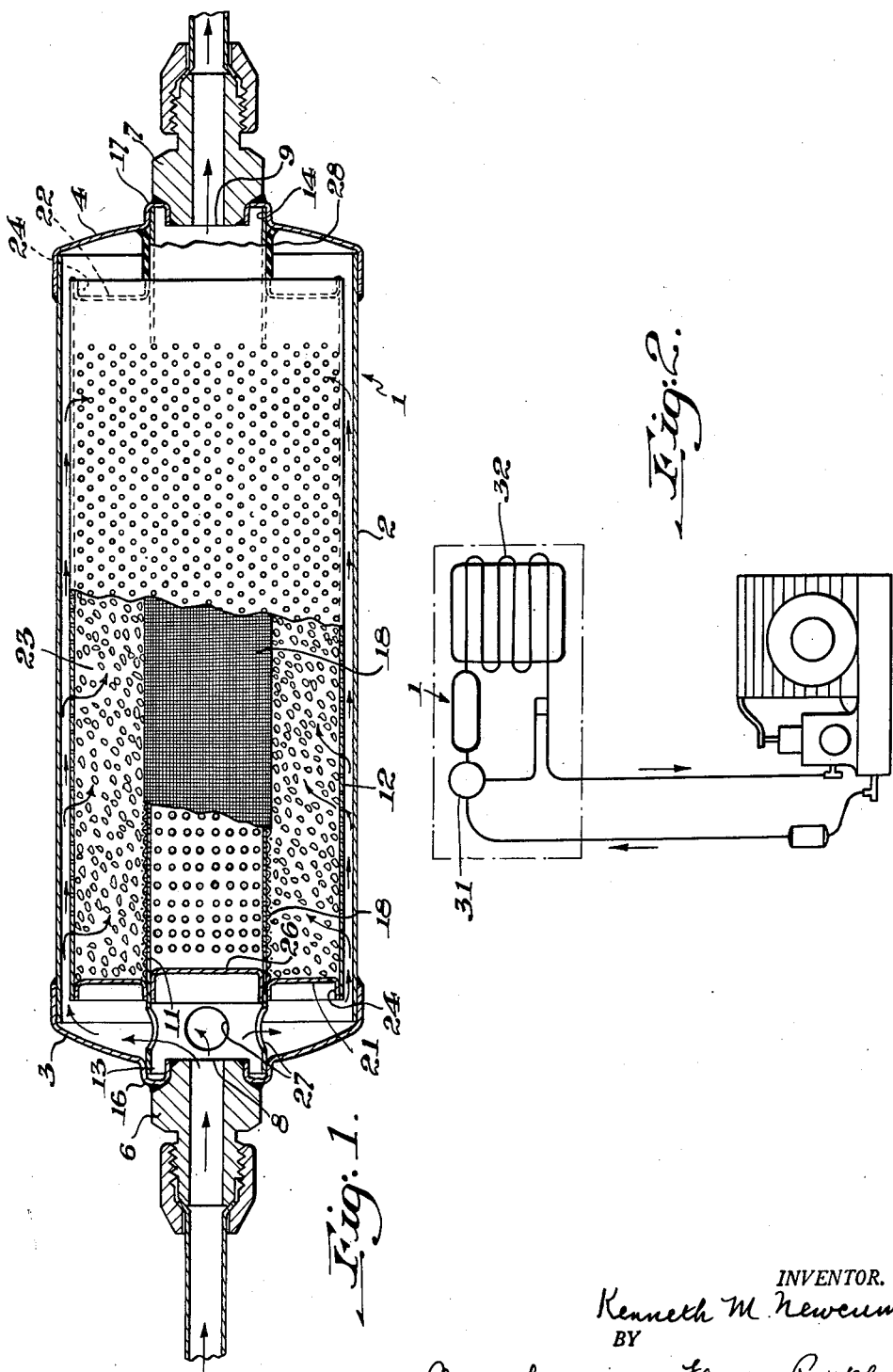
INVENTOR.
Kenneth M. Newcum
BY
Brown, Critchlow, Flick & Peckham
his ATTORNEYS.

Patented June 19, 1951

2,557,557

UNITED STATES PATENT OFFICE 2,557,557

REFRIGERANT DRIER-FILTER UNIT

Kenneth M. Newcum, Harmony, Pa., assignor to Remco, Inc., Zelienople, Pa., a corporation of Pennsylvania Application March 23, 1948, Serial No. 16,451

5 Claims. (Cl. 210—131)

This invention relates to refrigerating systems and, in particular, to units for dehydrating and filtering the refrigerants flowing through the systems.

Most refrigerating systems, both domestic and commercial, include drier-filter units, the drying being accomplished by passing the refrigerant through a bed of drying material, such as silica gel or activated alumina, and the filtering by the provision of a finely meshed filter screen. Drying is required because water vapor may leak into or enter the system during its installation or repair, and, if not removed, will "freeze out" at the refrigerant control and either destroy the efficiency of the control or completely block further refrigerant flow. Also, moisture in a system may react to form acids which will cause harmful corrosion. Filtering is desirable principally because, when the refrigerant is forced through a granular drying agent, such as silica gel, the resulting roiling or rubbing together of the granules produces a fine dust which must be filtered out of the system. Otherwise, this dust may affect the system's efficiency principally by choking the throttle valve and abrading its needle. In addition to this dust, foreign matter, including oil particles from the compressor pump, may find their way into the system and must be filtered out.

The drier-filters now in common use, simply described, are elongate casings connected into the piping of a refrigerating system and having an inlet opening at one end and outlet opening at the other, the space between the openings being solidly packed throughout their length with a granular drying agent. At the outlet end there is provided a finely meshed filter element designed to remove all or a portion of the drying agent dust and other foreign matter. Although suitable for use at certain locations in small capacity refrigerating systems, such units are impracticable when used in commercial systems and become more impracticable as the refrigerating capacity of the systems is increased. During recent years, the trend in commercial systems has been to increase their capacity, in other words, to circulate larger volumes of refrigerant through the system.

In an attempt to keep step with this trend, the prior units have been changed, simply by increasing the length of the drying agent bed so as to provide more drying material to dehydrate the refrigerant. This, however, also increases the resistance to flow of the refrigerant which, for several reasons, is undesirable. For one thing, these elongated units frequently clog up, this being due principally to the fact that the drying agent dust particles, which are caught by the fine-mesh filtering element, build up to such a thickness that the flow of the refrigerant through the unit is considerably decreased or stopped altogether. The fact that the drying agent bed is narrow and long increases the tendency to clog, since it increases the velocity of the flow of the refrigerant and thereby increases the agitation, or roiling, of the drying agent granules.

The "low side" of the system designates that side between the refrigerant control and the condenser pump. It is desirable to place the units in this side because there the temperature of the refrigerant is lowest. Temperature is important since at low temperatures less moisture is held in solution by the refrigerant, and, also, since agents, such as silica gel, most efficiently remove moisture if their temperature is low. The prior units are not effective if used in the low-side since, when so placed, the line pressure of the refrigerant is reduced to such an extent by being forced through their narrow, elongate drying beds, that refrigeration becomes very poor. Consequently, most prior units have been placed in the high pressure and high temperature "liquid line" of the system, and, particularly in larger commercial systems, fail to remove enough moisture to prevent "freezing out" at the refrigerant control. These recognized inefficiencies, coupled with other difficulties caused by clogging or abrading due to foreign matter, and corrosion resulting from acids which may be formed, have necessitated costly repairs and replacements.

It is among the objects of this invention to provide a simple, inexpensive and practical drier-filter unit which is capable of use in refrigerating systems of any rated capacity; which by quickly and efficiently removing a maximum percentage of the moisture content of the refrigerant precludes "freezing out"; which maintains a free, unclogged flow of the refrigerant through it; which by reducing the agitation of the drying agent granules minimizes the formation of drying agent dust, and which can be used at any location in the system without causing appreciable pressure drop.

According to the invention, an elongate casing is connected to the piping of the refrigerating system and the casing is provided with inlet and outlet openings permitting flow of the refrigerant through it. Centrally within the casing is positioned a perforated tube which, preferably, has imperforate end portions mounted in the casing walls and which, in turn, supports a perforated cylinder that encircles the tube. The end portions of the tube project beyond the ends of the cylinder, and, between the cylinder ends and the tube, are provided end plates which function both to close the space between the cylinder and the tube and to hold or suspend the cylinder in a spaced relation from the inner surfaces of the casing. The closing of the ends of the cylinder by these plates forms a containing space which is filled with a drying material for removing moisture from the refrigerant as it passes through the unit. Between these end plates the tube is covered with a layer of fine-mesh material for removing very fine particles of drying agent from the refrigerant. Also mounted in the tube near the inlet end of the casing is a closure or partition wall which functions to divide or seal off this end portion of the tube so that refrigerant entering the casing can not pass directly through the tube. The refrigerant flow through the tube then is from the inlet transversely through the cylinder, the drying agent and the filter material into the tube, from which it passes through the casing outlet to the refrigerating system. The disadvantages noted with reference to the prior commonly used drier-filter units are avoided principally because the refrigerant must pass transversely instead of longitudinally through the drying material.

The preferred embodiment of the invention is illustrated in the accompanying drawing, of which Fig. 1 is a section having certain portions of the casing and tube broken away to show underlying detail; and Fig. 2 illustrates the unit operatively connected into a rather diagrammatically shown refrigerating system.

Referring to the drawings, the unit comprises a casing 1 made up of a cylindrical shell 2 and end walls 3 and 4, the end walls being cup-shaped and tightly fitted over and secured to the ends of the casing shell in any suitable manner, such as by soldering. Each end wall is provided with a central opening in which are mounted pipe coupling members 6 and 7, the edges of these openings being turned inwardly to provide flanged surfaces to which the coupling members can be firmly anchored. The coupling members are for connecting the units into the piping of a refrigerating system and each is provided with an axial passage providing refrigerant inlet and outlet openings 8 and 9.

Interiorly of the casing is mounted a tube 11 and a cylinder 12, both of these members having perforated filtering areas. The tube has imperforate inlet and outlet ends 13 and 14 which project to each end wall of the casing where they are supported in annular recesses 16 and 17 formed around the casing's inlet and outlet openings. The portion of the tube between these supported ends is perforated and has a cover 18, preferably formed of the fine-mesh dutch weave metal cloth, wrapped around it.

The tube, being supported in this manner by the end walls of the casing, in turn carries cylinder 12 in such a position within the casing that the cylinder walls are at all points spaced from the outer shell and end walls of the casing. Also, the cylinder is shorter than the tube and concentrically surrounds the tube's central perforated portion. To hold the cylinder in this desired position, end plates 21 and 22 are provided, these plates fitting closely around the imperforate ends 13 and 14 of the tube and extending between the tube and cylinder so as to form, with these latter two members, an enclosed space in which a refrigerant drying agent 23, such as silica gel, is packed. The plate 22, at the outlet end of the casing, preferably is secured permanently by soldering its ends to the tube and cylinder, and is provided with flanges 24 providing surfaces for soldering. Plate 21, at the inlet end of the casing, has a tight fit around the tube and presses outwardly against the inner surfaces at the ends of the cylinder, but it is not secured to either of these members. These end walls 21 and 22 are for the purpose of holding the drying agent in position and also for preventing refrigerant from passing longitudinally through the drying agent bed. Also provided at the inlet end of the tube is another fixed partition wall 26 which divides imperforate inlet end 13 of the tube from its perforated central portion. This partition wall serves as a baffle to prevent refrigerant from passing directly from the inlet through the tube. Also, the inlet end of the tube is provided with a plurality of openings 27 through which the entering refrigerant can escape and flow in the path indicated by the arrows of Fig. 1. Over the outlet end of the tube is placed gasket 28 which, in an assembled unit, forms a seal between the tube and end wall 4.

In assembling this drier-filter unit, drying agent material, such as silica gel, is packed into the space provided by the cylinder, the tube and the outlet end plate. It is desirable to assure that the granules of the drying material are packed as tightly as possible without crushing them, and this may be accomplished by vibrating and shaking down the granules as the space is filled. With the container full, end plate 21 is slidably fitted over the inlet end of the tube and pressed against the granules, this inward pressure firmly holding the granules in position and reducing the possibility of drying agent dust being formed due to granules being rubbed together by the flowing refrigerant. Gasket 28 then is fitted around the outlet end of the tube, and the tube and cylinder are placed within the casing, it being assured that the outlet end of the tube is firmly seated in annular recess 17 of the casing's end wall. The assembly is completed by fitting end wall 3 over the inlet end of the casing and securing it in position by soldering or other means. If desired, inlet end wall 3 can be threaded on or otherwise removably attached to the casing so that, if replacements are desired, they can be simply made without the necessity of removing the complete unit from the system. In such case, the inlet connection could conveniently be on the side of the casing shell.

Referring particularly to Fig. 2, the unit 1 preferably is coupled into the low-side of the system between refrigerant control 31 and evaporator 32, although if desired it may be placed at the outlet end of the evaporator coils. In either position, the drying action is most efficient since the temperature of the refrigerant is lowest. The flow of refrigerant through the unit is shown by the arrows in Fig. 1. Following these arrows it is seen that the refrigerant passes from the inlet through tube openings 27 and then is diverted by tube partition wall 26 and inlet end plate 21 so that it must flow to the outside of perforate cylinder 12 where it is distributed evenly over the entire perforate surface. These perforations are of such a size that as the refrigerant passes through them, large particles of foreign material, such as foundry dirt and dust, pieces of gasket material, etc., are removed. The refrigerant next passes transversely through the drying agent which operates as a filter as well as a moisture remover. Because of the large area of the drying bed over which the refrigerant is distributed its flow through this bed is virtually a seepage. Consequently, there is relatively small tendency to agitate the granules of the bed, and relatively little granular dust is formed. The refrigerant next passes through fine mesh filter cloth 18 which removes any dust particles which may have been formed and also any finer particles of foreign matter. Compared to the prior disc-like fine mesh filter used for this purpose, the relatively large area of this cylindrical filter leaves but little possibility for any packing together of dust particles and, therefore, avoids clogging due to such packing together. After passing through the fine mesh, the dehydrated and cleaned refrigerant passes out into the refrigerating system through tube 11 and outlet opening 9.

None of the disadvantages which were noted with regard to prior units are present in the unit provided by this invention. If this unit is to be used in a commercial system through which a large volume of refrigerant flows at relatively high pressure, the length of the unit can increase sufficiently to provide ample drying agent. Regardless of the length of the particular unit used, the pressure drop across it will be, for practical purposes, unappreciable. This is because the refrigerant, instead of being forced to squeeze through the long narrow drying beds of prior filters, has a large area over which to expand and a relatively thin drying bed through which to pass. In prior filters, it was noted that "freezing out" of the refrigerant control occurred when insufficient amounts of moisture were removed from the refrigerant. This is avoided due to the fact that these units can be used in the low temperature and pressure side of the system and also because drying agents are "thirstier" at such a low temperature. In addition, corrosion is minimized due to this efficient drying effect. Also, the increased area of the fine mesh filter cloth efficiently removes both foreign matter and drying agent dust and avoids clogging due to the formation of thick layers of such dust.

In the above description the effect of the units when installed on the low-side of a system has been emphasized since the advantages of such a location are more marked and have not been taken advantage of by prior reasonably priced units. However, it is not intended to limit the use of the units to such a position since they are more efficient and reliable than the prior ones regardless of where installed.

According to the provisions of the patent statutes, I have explained the principle, construction and mode of operation of my invention and have illustrated and described what I now consider to represent its best embodiment. However, it is to be understood that, within the scope of the appended claims, the invention may be practiced by other forms than that specifically illustrated and described.

I claim:

1. A drier-filter unit for use in a refrigerating system, comprising a casing having refrigerant inlet and outlet openings, a perforated tube extending axially within the casing and having its end portions supported in the end walls of the casing, a perforated cylinder encircling said tube except at its end portions, plates closing the space between the ends of the cylinder and the tube and holding the cylinder in a spaced position from the inner surface of the casing, one of said plates being removable for filling the space between the cylinder and tube with a refrigerant drying material, the portion of said tube between said plates being covered with a layer of fine mesh material, and a closure for sealing the end of said tube adjacent to the casing inlet, whereby refrigerant flows from said inlet transversely through said cylinder, drying agent and fine mesh material into said tube from which it passes through said outlet to the refrigerating system.

2. A drier-filter unit for use in a refrigerating system comprising a casing having refrigerant inlet and outlet openings, a perforated tube extending axially within the casing and having end portions slidably fitted into annular recesses provided in the end walls of the casing, a perforated cylinder encircling said tube except at its end portions, plates closing the space between the ends of the cylinder and the tube and holding the cylinder in spaced relation from the inner surface of the casing, one of said plates being removable for filling the space between the cylinder and tube with a refrigerant drying material, the portion of said tube between said plates being covered with a layer of fine mesh material, and a closure for sealing the end of said tube adjacent to the casing inlet, whereby refrigerant flows from said inlet transversely through said cylinder, drying agent and fine mesh material into said tube from which it passes through said outlet to the refrigerating system.

3. A drier-filter unit for use in a refrigerating system comprising an elongate casing having refrigerant inlet and outlet openings in its end walls, a cylinder disposed within and spaced from said casing, an elongate tube mounted concentrically within said cylinder, each end of said tube projecting axially beyond the ends of the cylinder and being supported by one of said end walls in flush contact with the wall surfaces around said inlet and outlet openings, the major central portions of said tube and cylinder being perforated, said tube having its perforated portion covered with a layer of fine-mesh filter material and its inlet end provided with a plurality of openings, a tube-partition wall disposed inwardly of said tube openings and dividing the inlet end of the tube from its perforate portion, and plates closing the space between the ends of the cylinder and tube and holding the cylinder in spaced relation from the inner surfaces of the casing, one of said plates being removable for filling the space between the cylinder and tube with a refrigerant drying agent material, said refrigerant flowing from the inlet through said tube openings, then transversely through said perforated cylinder, drying agent fine-mesh filter material into said tube.

4. A drier-filter unit for use in a refrigerating system comprising an elongate casing having refrigerant inlet and outlet openings in its end walls, a cylinder disposed within and spaced from said casing, an elongate tube mounted concentrically within said cylinder, each end of said tube projecting axially beyond the ends of the cylinder and being supported by one of said end walls in flush contact with the wall surfaces around said inlet and outlet openings, the major central portions of said tube and cylinder being perforated, said tube having its perforated portion covered with a layer of fine-mesh filter material and its inlet end provided with a plurality of openings, a tube-partition wall disposed inwardly of said tube openings and dividing the inlet end of the tube from its perforate portion, and end plates fitted around the end portions of said tube and extending to the inner surfaces at the ends of said cylinder for forming a refrigerant drying agent containing space between the tube and cylinder and for holding the cylinder in spaced relation from the inner surfaces of the casing, one of said plates being slidably fitted between the tube and cylinder whereby it can be pressed inwardly to firmly hold said drying agent in position, said refrigerant flowing from the inlet through said tube openings, then transversely through said perforated cylinder, drying agent and fine-mesh filter material into said tube.

5. A drier-filter unit for use in a refrigerating system comprising an elongate casing having refrigerant inlet and outlet openings in its end walls, a cylinder disposed within and spaced from said casing, an elongate tube mounted concentrically within said cylinder and having end portions projecting axially beyond the end portions of the cylinder and slidably fitted into annular recesses provided in the end walls of the casing around its inlet and outlet openings, the major central portions of said tube and cylinder being perforated, said tube having its perforated portion covered with a layer of fine-mesh filter material and its inlet end provided with a plurality of openings, a tube-partition wall disposed inwardly of said tube openings and dividing the inlet end of the tube from its perforate portion, and end plates fitted around the end portions of said tube and extending to the inner surfaces at the ends of said cylinder for forming a refrigerant drying agent containing space between the tube and cylinder and for holding the cylinder in spaced relation from the inner surfaces of the casing, one of said plates being slidably fitted between the tube and cylinder whereby it can be pressed inwardly to firmly hold said drying agent in position, said refrigerant flowing from the inlet through said tube openings, then transversely through said perforated cylinder, drying agent and fine-mesh filter material into said tube.

KENNETH M. NEWCUM.

REFERENCES CITED

The following references are of record in the file of this patent:

UNITED STATES PATENTS

| Number | Name | Date |
|---|---|---|
| 619,569 | Hewell | Feb. 14, 1899 |
| 1,726,805 | Carrey | Sept. 3, 1929 |
| 2,031,935 | Cuno | Feb. 25, 1936 |
| 2,079,910 | Kamrath | May 11, 1937 |
| 2,325,399 | Houston | July 27, 1943 |
| 2,325,657 | Burkness | Aug. 3, 1943 |
| 2,365,149 | Anderson | Dec. 19, 1944 |
| 2,409,928 | Cahenzli, Jr. | Oct. 22, 1946 |
| 2,430,692 | Touborg | Nov. 11, 1947 |
| 2,446,853 | Savidge | Aug. 10, 1948 |